US011652825B2

(12) United States Patent
Yang et al.

(10) Patent No.: US 11,652,825 B2
(45) Date of Patent: May 16, 2023

(54) PACKET AUTHENTICATION IN A VXLAN SYSTEM

(71) Applicant: International Business Machines Corporation, Armonk, NY (US)

(72) Inventors: Na Fei Yang, Beijing (CN); Xiaojing Liu, Beijing (CN); Yong Quan Tian, Beijing (CN); Ming Xia Guo, Beijing (CN); Qi Li, Beijing (CN); Da Li Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/397,066

(22) Filed: Aug. 9, 2021

(65) Prior Publication Data

US 2023/0040723 A1 Feb. 9, 2023

(51) Int. Cl.
*H04L 29/06* (2006.01)
*H04L 9/40* (2022.01)

(52) U.S. Cl.
CPC ................... *H04L 63/126* (2013.01)

(58) Field of Classification Search
CPC .............................. H04L 63/126; H04L 29/06
See application file for complete search history.

(56) References Cited

U.S. PATENT DOCUMENTS

| | | | |
|---|---|---|---|
| 9,591,434 B1 * | 3/2017 | Cordes | H04L 63/0272 |
| 10,171,559 B2 | 1/2019 | Cai | |
| 2013/0311180 A1 | 11/2013 | Arnison | |
| 2015/0358293 A1 * | 12/2015 | Wood | H04L 63/0272 726/4 |
| 2016/0088022 A1 | 3/2016 | Handa | |
| 2016/0381015 A1 | 12/2016 | Ravinutala | |
| 2020/0177503 A1 | 6/2020 | Hooda | |
| 2021/0194728 A1 * | 6/2021 | Gundavelli | H04L 12/14 |
| 2022/0029808 A1 * | 1/2022 | Angel | H04L 63/1466 |

FOREIGN PATENT DOCUMENTS

| | | |
|---|---|---|
| CN | 103618596 B | 6/2017 |
| WO | 2015031512 A1 | 3/2015 |
| WO | 2018044341 A1 | 3/2018 |

OTHER PUBLICATIONS

"VXLAN Overview: Scaling Data Center Designs", ARISTA, White Paper, Jan. 2016, 7 pages.

(Continued)

*Primary Examiner* — Quazi Farooqui
(74) *Attorney, Agent, or Firm* — Erika R. DeCosty

(57) ABSTRACT

Embodiments of the present disclosure relate to methods, systems, and computer program products for event management. In a method, a token is obtained at a first agent device that is included in a network system, the token is for authenticating a first packet that is transmitted in the network system, and the first packet is generated according to a first network format. A second packet is generated based on the first packet and the token according to a second network format. The second packet is transmitted to a second agent device that is included in the network system, here both of the first and second agent devices support the first and second network formats. With these embodiments, the packet may be authenticated in a more effective way.

18 Claims, 7 Drawing Sheets

(56) References Cited

OTHER PUBLICATIONS

Balasubramanian, Chandrasekar, "Virtual Extensible LAN (VXLAN)", Feb. 28, 2019, 8 pages, <https://www.gavstech.com/virtual-extensible-lan-vxlan/>.

Frank, Yael, "Network Virtualization—Overlay Networks in Cloud Environments, Part 2", Stratoscale, Apr. 7, 2016, 5 pages, <https://www.stratoscale.com/blog/networking/network-virtualization-overlay-networks-cloud-environments-part-2/>.

Mell et al., "The NIST Definition of Cloud Computing", Recommendations of the National Institute of Standards and Technology, NIST Special Publication 800-145, Sep. 2011, 7 pages.

International Search Report and Written Opinion, International Application No. PCT/CN2022/095501, International Filing Date May 27, 2022.

\* cited by examiner

PACKET AUTHENTICATION IN A VXLAN SYSTEM

BACKGROUND

The present disclosure relates to packet authentication, and more specifically, to authenticating a packet in a Virtual eXtensible Local Area Network (VXLAN) system.

Nowadays, Virtual Extensible Local Area Networks (VXLANs) have been widely used in a network system to satisfy requirements of large-scale data centers and multi-tenant environments. For example, a VXLAN tunnel may be built between two Ethernet data centers. VXLAN uses VXLAN-like encapsulation techniques to encapsulate Ethernet packets that are generated within the Ethernet data centers and then transmits the encapsulated packets via the VXLAN tunnel.

SUMMARY

According to embodiments of the present disclosure, there is provided a computer-implemented method that may be implemented by one or more processors. In the method, one or more processors obtain, at a first agent device that is included in a network system, a token for authenticating a packet that is transmitted in the network system, the first packet being generated according to a first network format. One or more processors generate a second packet based on the first packet and the token according to a second network format. One or more processors transmit the second packet to a second agent device that is included in the network system. Here, both of the first and second agent devices support the first and second network formats.

According to embodiments of the present disclosure, there is provided a computer-implemented method that may be implemented by one or more processors. In the method, one or more processors receive from a first agent device that is included in a network system, a second packet, the second packet being received at a second agent device that is included in the network system. One or more processors determine whether the second packet matches a second token for authenticating a first packet that is transmitted in the network system. In response to determining that the second packet matches the second token, one or more processors forward the first packet that is included in a data field of the second packet, the first packet being generated according to a first network format, and the second packet being generated according to a second network format. Here, both of the first and second agent devices support the first and second network formats.

According to another embodiment of the present disclosure, there is provided a computer-implemented system. The computer-implemented system comprises a computer processor coupled to a computer-readable memory unit, where the memory unit comprises instructions that when executed by the computer processor implements the above methods.

According to another embodiment of the present disclosure, there is provided a computer program product. The computer program product comprises a computer readable storage medium having program instructions embodied therewith. The program instructions are executable by an electronic device to cause the electronic device to perform actions of the above methods.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
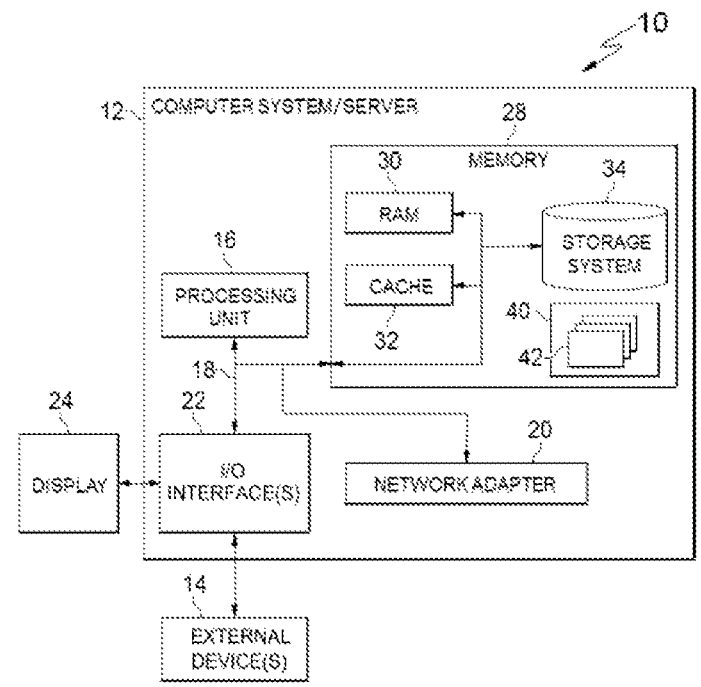
FIG. 1 depicts a cloud computing node according to embodiments of the present disclosure.

The present disclosure relates to packet authentication, and more specifically, to authenticating a packet in a Virtual eXtensible Local Area Network (VXLAN) system.

Different networks (such as an Ethernet network and a VXLAN network) may work together in a network system. However, VXLAN encapsulation by itself does not have any security protection ability, so the network security is faced with various types of risks. Network attackers can produce VXLAN packets that send across the internet will be accepted and injected onto layer 2 behind the firewalls and other security devices. For example, network attackers may send spoofed VXLAN packets to scan the subnet info, or send broadcast packets via the VTEP, or send DNS request to the inside server, etc. It may cause the network congestion and other serious negative impacts, example with more details can be seen later. Due to lack of the packet authentication, a network attacker may send a fake packet and pretend that the fake packet is a legal or valid packet from the first VTEP. In view of the above drawbacks, embodiments of the present disclosure provide solutions for authenticating a packet in a VXLAN system. Embodiments of the present invention introduce dynamic VXLAN packet authentication mechanisms on both the control panel and data panel to improve the security, reliability, and serviceability in a VXLAN system.

Some embodiments will be described in more detail with reference to the accompanying drawings, in which the embodiments of the present disclosure have been illustrated.

However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
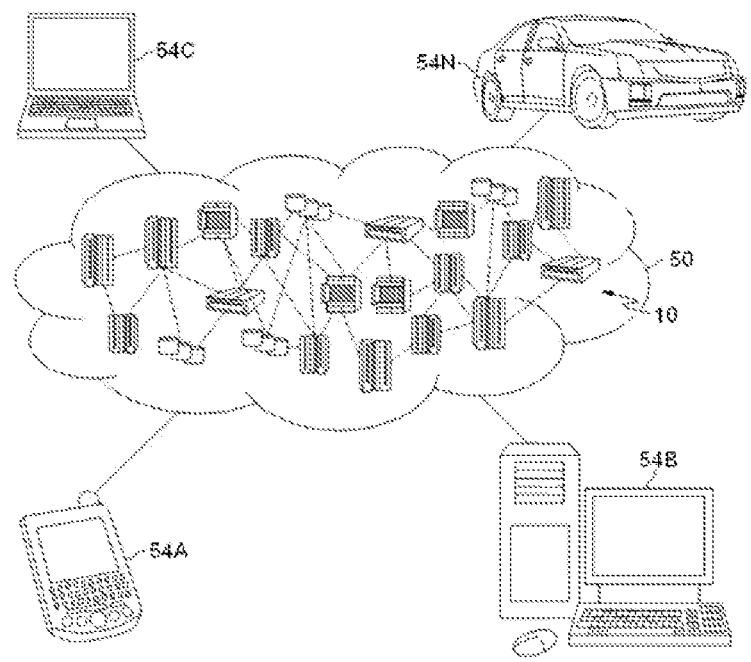
FIG. 2 depicts a cloud computing environment according to embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
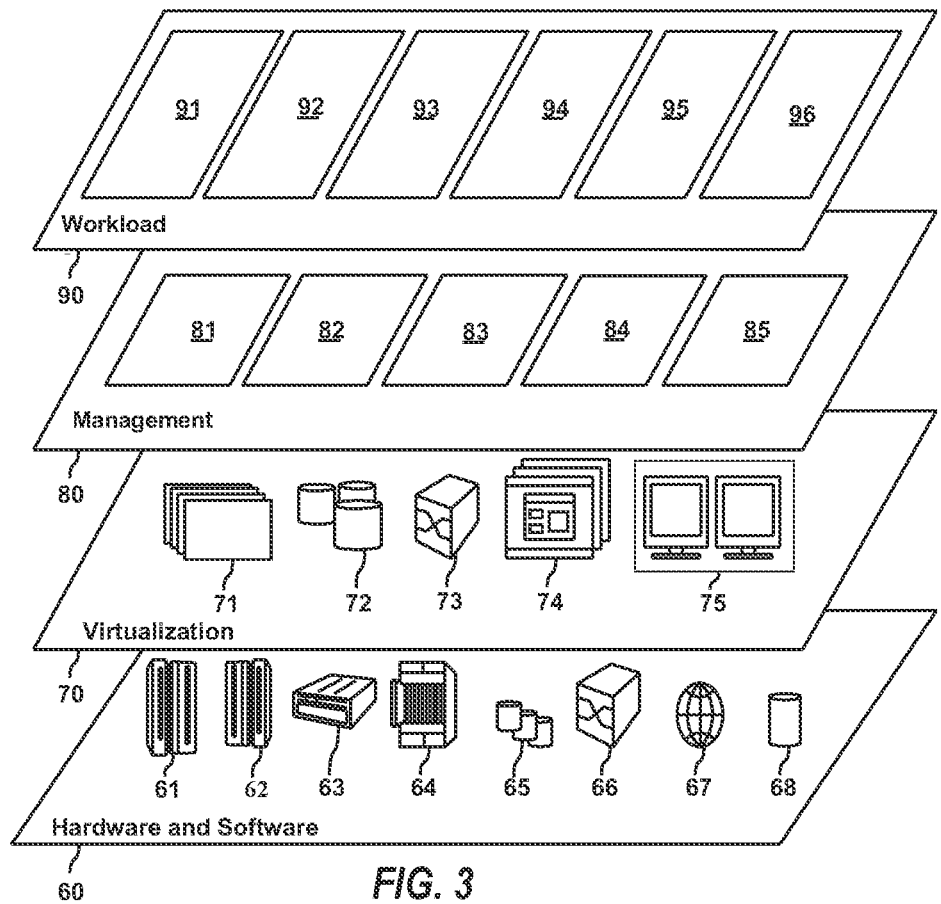
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and packet authentication processing 96.

Figure 4:
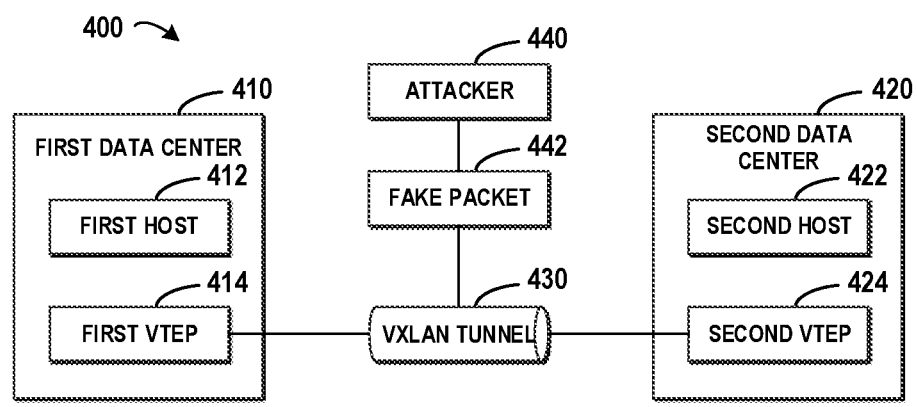
FIG. 4 depicts an example network system in which embodiments of the present disclosure may be implemented.

It should be noted that the packet authentication processing 96 according to embodiments of the present disclosure could be implemented by computer system/server 12 of FIG. 1. By now, different networks (such as an Ethernet network and a VXLAN network) may work together in a network system. However, VXLAN encapsulation by itself does not have any security protection ability, so the network security is faced with various types of risks. Therefore, it is desired to increase the security level in the network system. A working environment of the present disclosure will be described below with reference to FIG. 4, which depicts an example network system 400 in which embodiments of the present disclosure may be implemented. In FIG. 4, a first data center 410 and a second data center 420 may be included in the network system 400. Here, the first data center 410 may include one or more hosts (such as a first host 412) and a first agent device (working as a first VXLAN Tunnel Endpoint (VTEP) 414). The first VTEP 414 may communicate with the first host 412 according to the Ethernet protocol.

Similarly, the second data center 420 may include one or more hosts (such as a second host 422) and a second agent device (working as a second VTEP 424), and the VTEP 424 may communicate with the second host 422 according to the Ethernet protocol. Here, a VXLAN tunnel 430 is provided between the first and second VTEPs 414 and 424, and the first VTEP 414 may encapsulate an Ethernet packet from the first host 412 into a VXLAN packet according to the VXLAN format. Then, the first VTEP 414 may transmit the VXLAN packet to the second VTEP 424 via the VXLAN tunnel 430. However, due to lack of the packet authentication, an attacker 440 may send a fake packet 442 (i.e., malicious packet) and pretend that the fake packet 442 is a legal or valid packet from the first VTEP 414. At this point, the network system 400 may be faced with potential attacks and risks.

Figure 5:
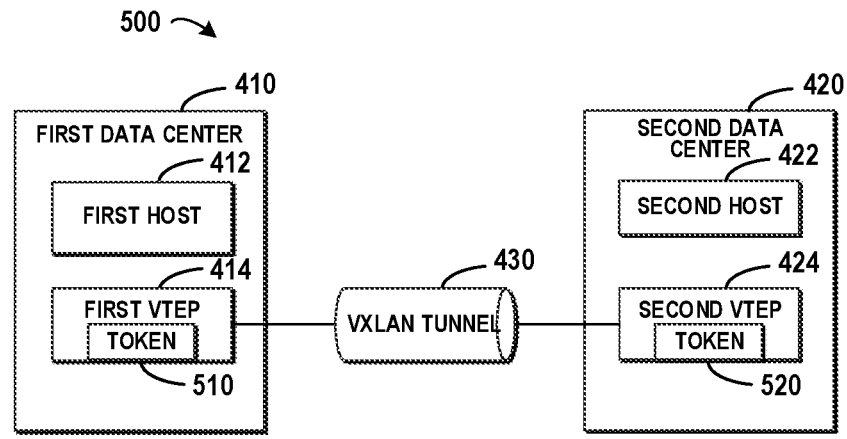
FIG. 5 depicts an example procedure for authenticating a packet in a network system according to embodiments of the present disclosure.

In view of the above drawbacks, embodiments of the present disclosure provide solutions for authenticating a packet in a VXLAN system. Reference will be made to FIG. 5 first for a general description of embodiments of the present disclosure. FIG. 5 depicts an example procedure 500 for authenticating a packet in a network system according to embodiments of the present disclosure. In FIG. 5, a token 510 may be provided to the first VTEP 414 for authenticating packets transmitted between the first and second data centers 410 and 420. Here, the token 510 may be used for encapsulating the Ethernet packet from the first host 412 into a VXLAN packet. Similar, a token 520 which is identical to the token 510 may be provided to the second VTEP 424 for packet authentication. If a VXLAN packet received at the second VTEP 424 matches the token 520, it may be determined that the received VXLAN packet is really from the first VTEP 414. Otherwise, the received VXLAN packet may be determined as a fake or malicious packet. In these embodiments, the first and second VTEPs 414 and 424 support both of the Ethernet network format and the VXLAN format, where the Ethernet network format is used for local communications within each data center, and the VXLAM format is used for remote communications between the two data centers.

Figure 6:
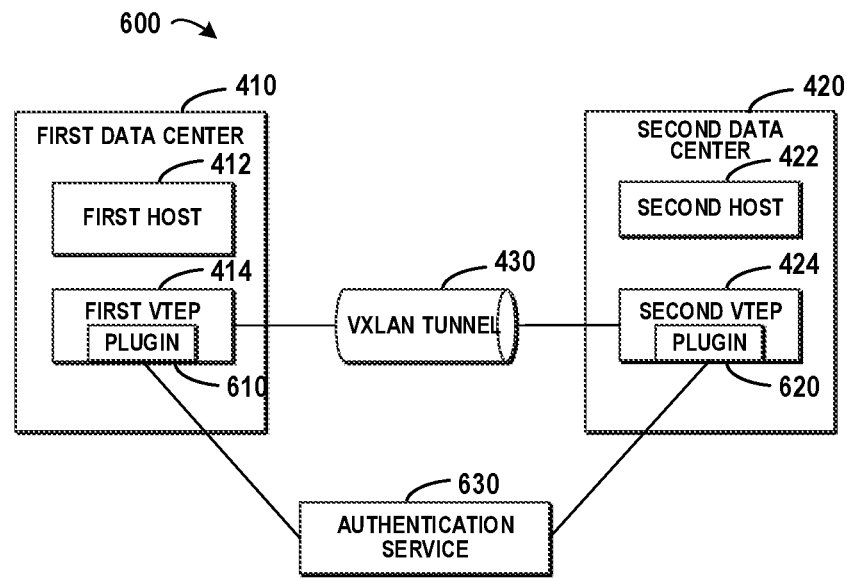
FIG. 6 depicts an example diagram including components for authenticating a packet in a network system according to embodiments of the present disclosure.

Multiple components may be deployed in the network system 400 for the packet authentication. FIG. 6 depicts an example diagram 600 including components for authenticating a packet in a network system according to embodiments of the present disclosure. In FIG. 6, an authentication service 630 may be deployed in the network system 600 for issuing the tokens 510 and 520. Alternatively, and/or in addition to, the authentication service 630 may be deployed outside the network system 600 as along as the first and second VTEP 414 and 424 may obtain the tokens 510 and 520 respectively. Further, a plugin 610 may be deployed at the first VTEP 414 for generating and transmitting VXLAN packets to the second VTEP 424. Further, the plugin 610 may verify VXLAN packets received from the second VTEP 424. Similarly, a plugin 620 may be deployed at the second VTEP 424. Hereinafter, reference will be made to FIG. 7 for more details about the packet authentication.

Figure 7:
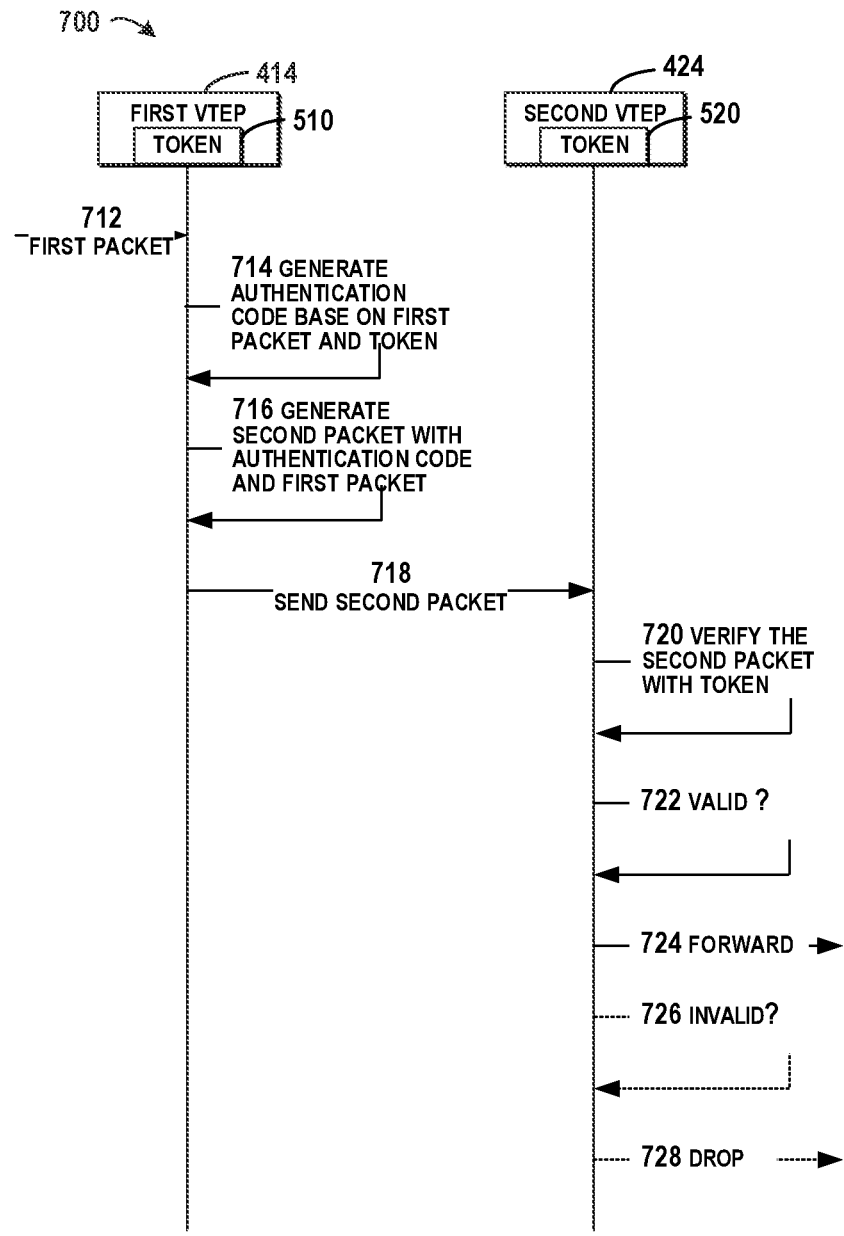
FIG. 7 depicts an example procedure for authenticating a packet in a network system according to embodiments of the present disclosure.

FIG. 7 depicts an example procedure 700 for authenticating a packet in a network system according to embodiments of the present disclosure. In the example procedure 700, the first VTEP 414 converts a first packet (in the Ethernet format) that is received from the first host 412 into a second packet (in the VXLAN format) based on the token 510. Further, the second VTEP 424 receives the second packet from the first VTEP 414 and verifies the second packet. In the context of the present disclosure, the first packet may be an inner Ethernet frame that is to be encapsulated by the first VTEP 414. Further, although FIG. 7 illustrates the procedure 700 for authenticating a packet that is sent from the first VTEP 414 to the second VTEP 424, the illustrated procedure may also be implemented for authenticating a packet that is sent in another direction. For example, the second VTEP 424 may encapsulate a packet and send to the first VTEP 414. Then the first VTEP 414 may verify the encapsulated packet.

In these embodiments of the present disclosure, the token 510 may be obtained from the authentication service 630 and the token 510 is used for authenticating packets transmitted in the network system 400. Further, in order to prevent a potential risk that the token is stolen by the attacker 440, the token 510 may be assigned a validity period. For example, the authentication service 630 may issue tokens at a predetermined interval of 30 milliseconds (or anther time interval). At this point, the token 510 at each VTEP may be refreshed at every 30 milliseconds. In some embodiments of the present disclosure, a cache may be configured for storing at least one token that is issued by the authentication server 630. Here, the at least one token may be stored according to a chronological order and the first VTEP 414 may obtain the latest token (which is valid at the current time point) from the cache. Similarly, the second VTEP 424 may directly obtain the token 520 from the authentication service 630. Additionally, and/or in addition to, the second VTEP 424 may obtain the token 520 from a corresponding cache, and the token 520 may be refreshed periodically at the predetermined interval.

Figure 8A:
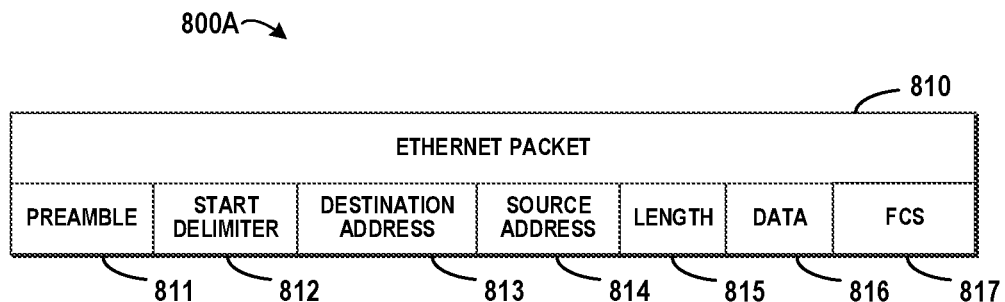
FIG. 8A depicts an example data structure for an Ethernet format according to embodiments of the present disclosure.

Referring to FIG. 7, the first VTEP 414 may receive 712 a first packet from the first host 412. Here the first packet is generated according to a first network format (such as the Ethernet format). FIG. 8A depicts an example data structure 800A for the Ethernet format according to embodiments of the present disclosure. In FIG. 8A, an Ethernet packet 810 may include various fields 811 to 817. Here, a preamble 811 may identify the Ethernet packet 810. A start delimiter 812 may indicate the start of the Ethernet packet 810, a destination address 813 may indicate a destination of the Ethernet packet 810, a source address 814 may indicate a source of the Ethernet packet 810, a length 815 may indicate a length of the Ethernet packet 810, and data 816 may store the payload of the Ethernet packet 810, and a frame check sequence (FCS) 817 may be represented by a parity that is determined based on the Cyclic Redundancy Check (CRC). In order to authenticate the first packet, the first VTEP 414 may generate a second packet based on the first packet and the token according to a second network format (such as the VXLAN format) supported by the network system.

Returning back to FIG. 7 for more details for the packet authentication, the first VTEP 414 may generate 714 an authentication code based on the first packet and the token 510. As multiple Ethernet packets may be received at the first VTEP 414, an identification may be determined for each of the Ethernet packets so as to obtain a unique ID for each Ethernet packet. In some embodiments of the present disclosure, the parity (such as the FCS 817) of the first packet may be extracted from the above Ethernet packet 810 as the identification. With these embodiments, the first packet may be identified in a simple and effective way. Further, the identification may provide an anti-tampering function to the transmitting procedure. Alternatively, and/or in addition to, a signature determined by another method may be taken as the identification. Further, the authentication code may be generated based on the identification and the token 510.

In some embodiments of the present disclosure, all 4 bytes in the FCS 817 may be used as the identification. In some embodiments of the present disclosure, a portion may be selected from the FCS 817 as the identification. Specifically, an identification length may be defined in advance. With these embodiments, the identification length may vary such that it may provide more flexibility to the packet authentication. In some embodiments, a parameter X may be defined for representing how many bytes should be removed from the FCS 817. For example, X=1 indicates that the lower 1 byte (i.e., 8 bits) in the FCS 817 will be removed. At this point, the following Formula 1 may be used for determining the identification:

$$\text{FCS ID} = ((\text{FCS } \&((0\text{xffffffff} << X*8) \& 0\text{xffffffff})) >> 8) | (\text{FCS } \&(0\text{xffffffff} >> (5-X)*8)) \quad \text{Formula 1}$$

Where FCS ID represents the identification for the first packet, FCS represents the FCS field in the first packet, and X represents the bytes that are to be removed from the FCS field.

Further, the authentication code may be generated based on the identification and the token 520. For example, the following Formula 2 may be used for determining the authentication code:

$$\text{AUTHCODE} = \text{FCS ID } \& \text{ token} \quad \text{Formula 2}$$

Where the AUTHCODE represents the authentication code for the first packet, FCS ID represents the identification for the first packet, and token represents the token 510 from the authentication service 630. With these embodiments, the authentication code may be determined based on simple calculations. It is to be understood that the above Formulas 1 and 2 just show examples for determining the identification and the authentication code. Alternatively, and/or in addition to, other formulas may be adopted.

Although not illustrated in FIG. 7, in some embodiments of the present disclosure, the first VTEP 414 may query the authentication service 630 and check whether the token 510 is valid at the current time point. If the token 510 is valid, then the token 510 may be used for generating the authentication code, which in turn is used for generating the second packet. If the token 510 is expired and becomes invalid, the token 510 may be refreshed from the authentication service 630. Alternatively, and/or in addition to, the latest token may be obtained from the cache. At this point, a subsequent token that is issued after the token 510 may be obtained for generating the authentication code. With these embodiments, each of the tokens has its own validity period, and thus even if a token is stolen by the attacker 440, the token becomes invalid after the validity period.

Figure 8B:
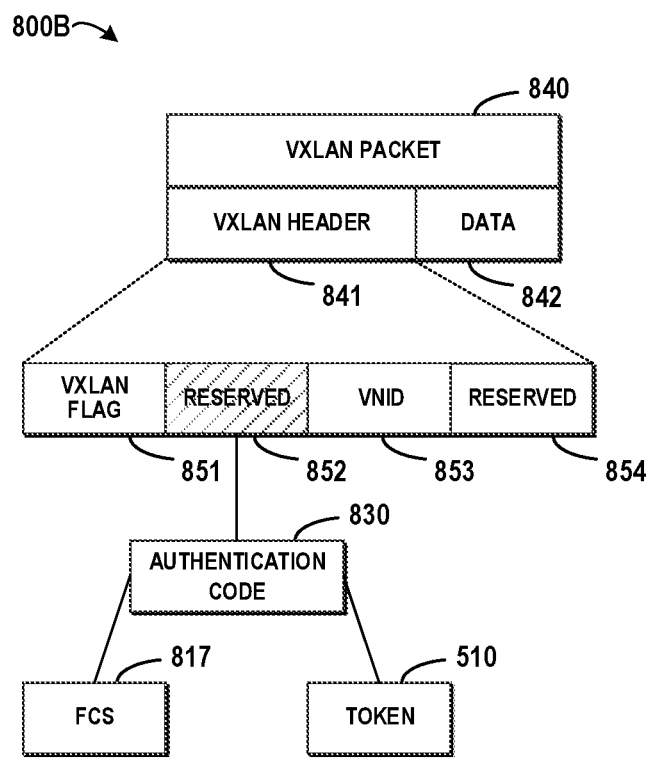
FIG. 8B depicts an example data structure for a VXLAN format according to embodiments of the present disclosure.

Further, the first VTEP 414 may generate 716 the second packet with the authentication code and the first packet. Specifically, the first packet may be inserted in a data field of the VXLAN packet, and the authentication code may be inserted in a reserved field of the VXLAN packet. Reference will be made to FIG. 8B for more details for generating the second packet. FIG. 8B depicts an example data structure 800B for a VXLAN format according to embodiments of the present disclosure. Here, the second packet is generated according to the format of the VXLAN packet 840, which may include: a VXLAN header 841, for representing a start of the VXLAN packet 840; and data 842, for storing the payload of the VXLAN packet 840. As shown in FIG. 8B, the content of the first packet may be inserted into the data 842. Further, the VXLAN header 841 may include: a VXLAN flag 851, a first reserved field 852, a VNID 853, and a second reserved field 854. Accordingly, the authentication code 830 that is generated from the FCS 817 and the token 510 may be inserted into the first reserved field 852. At this point, the second packet encapsulates both of the first packet and the authentication code for further authentication.

Referring back to FIG. 7, the first VTEP 414 may send 718 the second packet to the second VTEP 424. Once the second VTEP 424 receives the second packet, the second VTEP 424 may verify 720 the second packet with the token 520 by determining whether the second packet matches the token 520. Specifically, the second VTEP 424 may extract an authentication code from a reserved field that is included in the second packet. For example, the authentication code 830 in the first reserved field 852 may be extracted, and the extracted authentication code is generated from the token 510 and the first packet. The second VTEP 424 may determine 722 that the second packet is valid. In response to determining that the second packet is valid, the second VTEP 424 may forward 724 the packet to the second host 422. The second VTEP 424 may determine 726 that the second packet is invalid. In response to determining that the second packet is invalid, the second VTEP 424 may drop 728 the second packet.

In some embodiments of the present disclosure, the second packet may be analyzed for extracting the first packet from the data 842 of the VXLAN packet 840, and then an identification may be determined for the extracted first packet. Here, the method for determining the identification is the same as what is implemented at the first VTEP 414. For example, the parity such as the FCS field of the first packet may be extracted. Further, the above Formula 1 may be used for determining the identification and then the above Formula 2 may be performed based on the identification and the token 520, so as to calculate the second authentication code based on the identification and the token 520.

In some embodiments of the present disclosure, before the generation of the second authentication code, the second VTEP 424 may query the authentication service 630 for checking whether the token 520 is valid. If the token 520 is valid, the token 520 may be used for generating the second authentication code. If the token 520 is invalid, it means that the token 520 is expired and the latest token may be obtained from the authentication service 630 or the cache for generating the second authentication code.

Afterwards, the second authentication code (which is generated from the token 520) and the authentication code (which is generated from the token 510) may be compared. If the two authentication codes match, then the second packet received at the second VTEP 424 matches the token 520, and thus the second packet is verified as a legal or valid packet from the first VTEP 414. At this point, the first packet that is extracted from the data field of the second packet may be forwarded to the second host 422 that is connected to the second VTEP 424. With these embodiments, only the authenticated packets are forwarded to the second host 422.

In some embodiments of the present disclosure, a mismatch between the two authentication codes may relate to different situations. In one situation, the second packet received at the second VETP 424 may be a fake or malicious packet from the attacker 440, and thus the second packet should be dropped. In another situation, the second packet is authenticated with a previous token which is issued by the authentication service 630 at an earlier time point. Therefore, one or more previous token should be obtained for distinguishing the above two situations.

In some embodiments of the present disclosure, in response to a mismatch between the two authentication codes, a previous token that is issued before the token may be obtained from the authentication service or the cache. Next, a further authentication code may be generated based on the previous token and FCS of the first packet that is extracted from the second packet. If the further authentication code does not match the authentication code that is extracted from the second packet, it indicates that the second packet is a fake or malicious packet and thus should be dropped. If the further authentication code matches the authentication code, it means that the second packet is a legal or valid packet from the first VTEP 414. Further, the second packet may be forward to the second host 422. With these embodiments, fake or malicious packets are dropped, which ensures that only legal or valid packets are forwarded to a target host in the second data center. On one hand, the security level of the network system 400 is increased by dropping the fake or malicious packets. On the other hand, the bandwidth cost caused by packet forwarding may be reduced.

Figure 9:
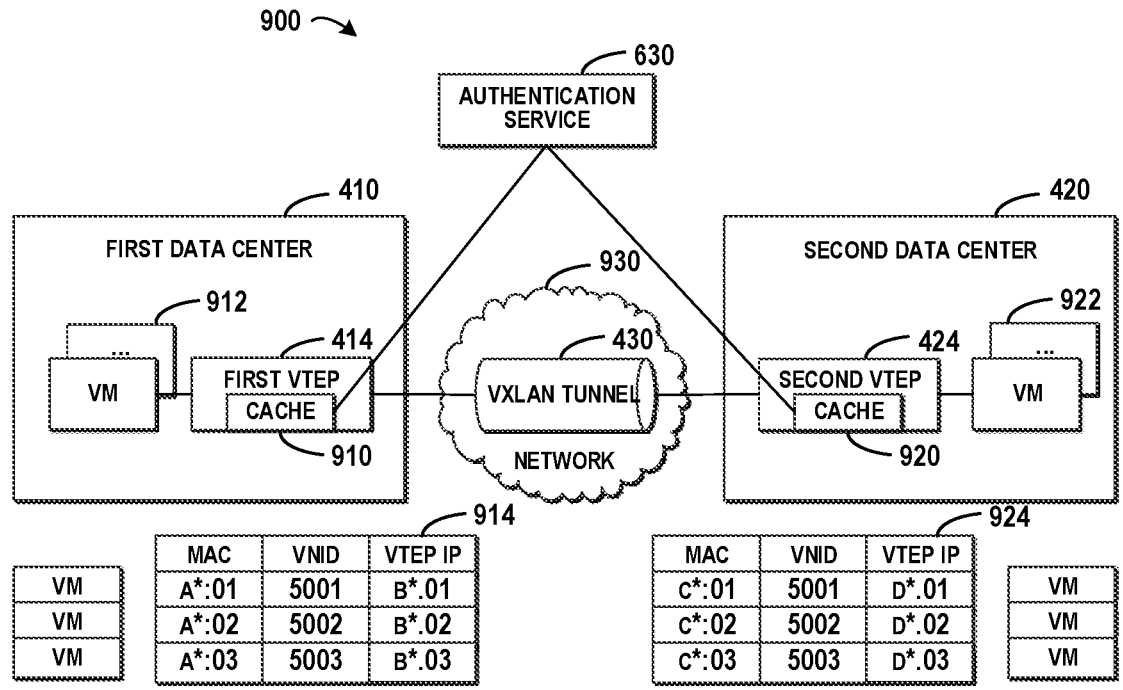
FIG. 9 depicts a detailed procedure for authenticating a packet in a network system according to embodiments of the present disclosure.

Hereinafter, reference will be made to FIG. 9 for more details about the authentication procedure, where FIG. 9 depicts a detailed procedure 900 for authenticating a packet in a network system according to embodiments of the present disclosure. Here, the host depicted in previous drawings may be implemented by a Virtual Machine (VM) and thus the first data center 410 may include one or more VM 912. Further, the first VTEP 414 may include a cache 910 for storing the token that is distributed by the authentication service 630. Similarly, the second data center 420 may include one or more VM 922, and the second VTEP 424 may include a cache 920 for storing the token that is distributed by the authentication service 630.

Further, a table 914 may be stored in the first data center 410 for recording parameters for each of the VMs 912 in the first data center 410. As shown in the table 914, the first column represents a MAC (Media Access Control) address of the VM, the second column represents a VNID (VXLAN Network Identifier), and the third column represents a VTEP IP for the VM. Similarly, a table 924 may be provided in the second data center 420. In order to implement the above authentication procedure, the authentication service 630 first distributes tokens to the cache 910 and cache 920, respectively. Then, the first VETP 414 receives a first packet from a VM that is recorded in the table 914, generates a second packet based on the first packet and the token stored in the cache 910, and then sends the second packet to the second VTEP 424. Further, the second VTEP 424 verifies the received second packet based on the token stored in the cache 920. If the received second packet is verified, it is forwarded to a corresponding VM based on the table 924.

Figure 10:
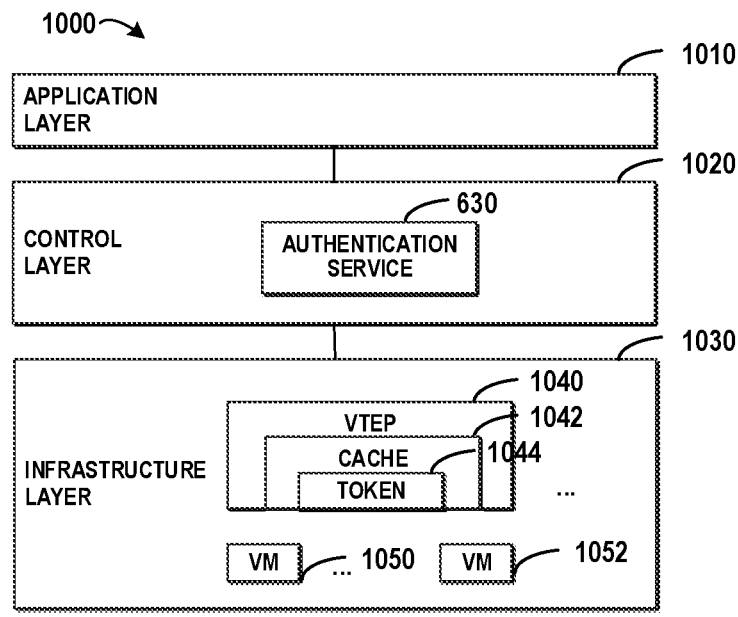
FIG. 10 depicts an example architecture of a network system according to embodiments of the present disclosure.

FIG. 10 depicts an example architecture 1000 of a network system according to embodiments of the present disclosure. In FIG. 10, the network system includes: an application layer 1010 for implementing normal data communications between VMs in the network system, which may be implemented by the transaction processing 95 in FIG. 3; a control layer 1020 for managing tokens 1044, which may be implemented by the packet authentication processing 96 in FIG. 3, and an infrastructure layer 1030, which may be implemented by the networks and networking components 66 in FIG. 3, for providing physical resources, such as a VTEP 1040 and other VTEPs (not illustrated in FIG. 10) and VMs 1050, . . . , 1052. During operations of the network system, the authentication service 630 in the control layer 1020 may distribute tokens to the VTEP 1040 and other VTEPs. Then, these VTEPs may implement the authentication procedure as described in preceding paragraphs, so as to transmit and/or receive packet(s) among the VMs 1050, . . . , and 1052 in a safe way. In an embodiment, cache 1042 is used for storing at least one token 1044 that is issued by the authentication server.

Although embodiments of the present disclosure are described by taking the Ethernet network format and the VXLAN format as examples of the first and second network formats, embodiments of the present disclosure may be applied to another network system including two or more data centers that support different network formats. Specifically, the two or more data centers may support two different network formats, where the one network format is used for local communications within each of the data centers, and another network format is used for remote communications between the data centers. With the above embodiments, fake or malicious packets may be detected, and the security level of the network system may be increased.

Figure 11A:
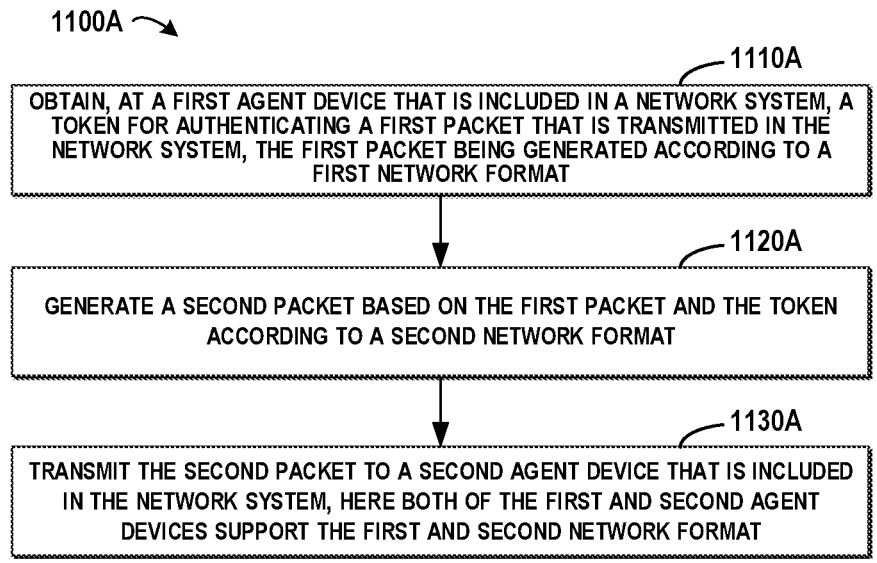
FIG. 11A depicts an example flowchart of a method for authenticating a packet at an agent device according to embodiments of the present disclosure.
Figure 11B:
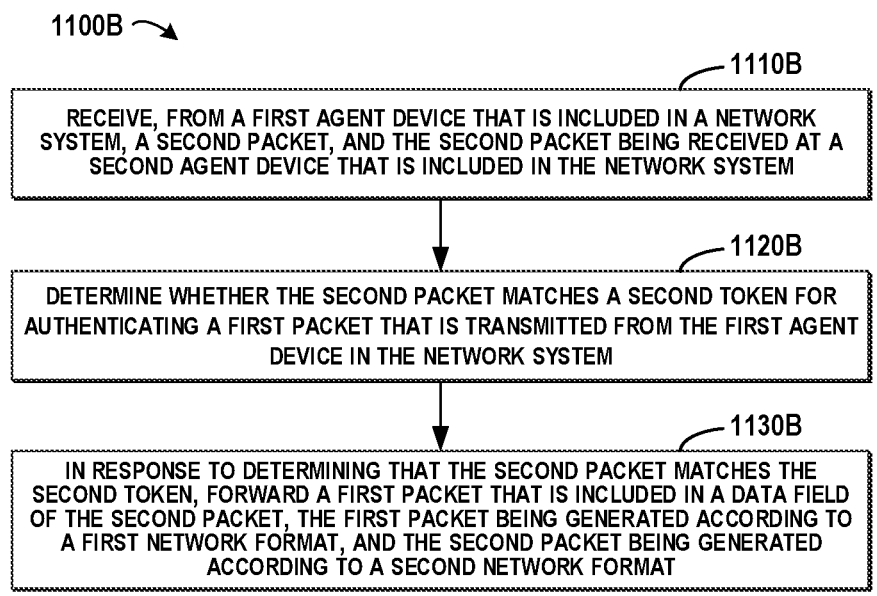
FIG. 11B depicts an example flowchart of a method for authenticating a packet at another agent device according to embodiments of the present disclosure.

Reference will be made to FIGS. 11A and 11B for more details about embodiments of the present disclosure. FIG. 11A depicts an example flowchart for a method 1100A for authenticating a packet at an agent device according to embodiments of the present disclosure. At block 1110A, a token is obtained at a first agent device that is included in a network system, wherein the token is used to authenticate a packet that is transmitted in the network system, and the first packet is generated according to a first network format. At block 1120A, a second packet is generated based on the first packet and the token according to a second network format supported by the network system. At block 1130A, the second packet is transmitted to a second agent device that is included in the network system. Here, both of the first and second agent devices support the first and second network formats.

In some embodiments of the present disclosure, an identification is obtained for the first packet, and then the second packet is generated based on the identification, the token, and the first packet. In some embodiments of the present disclosure, in order to obtain the identification for the first packet, a parity of the first packet is obtained, and then the identification is determined for the first packet based on the parity and a predefined length for the identification. In some embodiments of the present disclosure, in order to obtain the parity of the first packet, a frame check sequence is extracted from the first packet according to the first network format. In some embodiments of the present disclosure, an authentication code is generated based on the identification and the token. Then, the authentication code is added into a reserved field that is included in the second packet, and the first packet is added into a data field that is included in the second packet.

In some embodiments of the present disclosure, if it is determined that the token is valid, the second packet is generated based on the first packet and the token according to the second network format. In some embodiments of the present disclosure, if it is determined that token is invalid, the second packet is generated based on the first packet and a subsequent token that is issued after the token according to the second network format. In some embodiments of the present disclosure, the token is obtained from one or more of: an authentication service for authenticating a packet that is transmitted in the network system; or a cache for storing at least one token that is issued by the authentication server. In some embodiments of the present disclosure, the first network format includes an Ethernet format and a Virtual eXtensible Local Area Network (VXLAN), the second network format includes a VXLAN format, the first and second agent devices include VXLAN Tunnel Endpoints, respectively, and the method is implemented by a plugin deployed at the first agent device.

FIG. 11B depicts an example flowchart for a method 1100B for authenticating a packet at another agent device according to embodiments of the present disclosure. At block 1110B, a second packet is received from a first agent device that is included in a network system, and the second packet is received at a second agent device that is included in the network system. At block 1120B, it is determined whether the second packet matches a second token for authenticating a first packet that is transmitted from the first agent device in the network system. At block 1130B, if it is determined that the second packet matches the second token, a first packet that is included in a data field of the second packet is forwarded. Here, the first packet is generated according to a first network format, and the second packet is generated according to a second network format supported by the network system.

In some embodiments of the present disclosure, in order to determine whether the second packet matches the second token, an authentication code is extracted from a reserved field that is included in the second packet. Next, a second authentication code is generated based on the second token and the first packet. If it is determined that the authentication code matches the second authentication code, the second packet is determined to match the second token. In some embodiments of the present disclosure, if the second token is valid, the second authentication code is generated based on the second token and the first packet. In some embodiments of the present disclosure, in order to generate the second authentication code, an identification is determined for the first packet, and then the second authentication code is generated based on the second token and the identification.

In some embodiments of the present disclosure, a parity is obtained for the first packet, and then the identification is determined for the first packet based on the parity and a predefined length for the identification. In some embodiments of the present disclosure, if the second packet does not match the second token, a previous token, that is issued before the second token, is obtained for authenticating a packet transmitted in the network system. Then, the second authentication code is generated based on the previous token and the first packet. In some embodiments of the present disclosure, if the second packet does not match the previous token, the second packet is dropped. In some embodiments of the present disclosure, the network system includes a Ethernet network and a Virtual eXtensible Local Area Network (VXLAN), the first network format includes an Ethernet format, the second network format includes a VXLAN format, the first and second agent devices include VXLAN Tunnel Endpoints, respectively, and the method is implemented by a plugin deployed at the second agent device.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a VXLAN System comprising:
    obtaining, by one or more processors and at a first agent device that is included in a network system, a token for authenticating a first packet that is transmitted in the network system, the first packet being generated according to a first network format;
    generating, by one or more processors, a second packet based, at least in part, on the first packet, the token according to a second network format, and an identification for the first packet; and
    transmitting, by one or more processors, the second packet to a second agent device that is included in the network system, both of the first and second agent devices supporting the first and second network formats.

2. The computer-implemented method of claim 1, wherein the identification for the first packet comprises:
    obtaining, by one or more processors, a parity of the first packet; and
    determining, by one or more processors, the identification for the first packet based, at least in part, on the parity and a predefined length for the identification.

3. The computer-implemented method of claim 2, wherein obtaining the parity of the first packet comprises: extracting, by one or more processors, a frame check sequence from the first packet according to the first network format.

4. The computer-implemented method of claim 1, wherein generating the second packet based on the identification, the token, and the first packet comprises:
    generating, by one or more processors, an authentication code based on the identification and the token;
    adding, by one or more processors, the authentication code into a reserved field that is included in the second packet; and
    adding, by one or more processors, the first packet into a data field that is included in the second packet.

5. The computer-implemented method of claim 1, wherein generating the second packet based on the first packet and the token comprises one or more of:
    in response to determining that the token is valid, generating, by one or more processors, the second packet based on the first packet and the token according to the second network format; and in response to determining that the token is invalid, generating, by one or more processors, the second packet based on the first packet and a subsequent token that is issued after the token according to the second network format.

6. The computer-implemented method of claim 1, wherein obtaining the token comprises obtaining the token from one or more of:

an authentication service for authenticating a packet that is transmitted in the network system; and a cache for storing at least one token that is issued by the authentication server.

7. The computer-implemented method of claim 1, wherein the network system includes an Ethernet network and a Virtual eXtensible Local Area Network (VXLAN), the first network format includes an Ethernet format, the second network format includes a VXLAN format, the first and second agent devices include VXLAN Tunnel Endpoints, respectively, and the method is implemented by a plugin deployed at the first agent device.

8. A computer-implemented method for a VXLAN system comprising:

receiving, by one or more processors, from a first agent device that is included in a network system, a second packet, the second packet being received at a second agent device that is included in the network system; and determining, by one or more processors, whether the second packet matches a second token for authenticating a first packet that is transmitted from the first agent device in the network system, wherein determining whether the second packet matches the second token comprises:

extracting, by one or more processors, a first authentication code from a reserved field that is included in the second packet;

generating, by one or more processors, a second authentication code based on the second token and the first packet; and in response to determining that the authentication code matches the second authentication code, determining, by one or more processors, that the second packet matches the second token.

9. The computer-implemented method of claim 8, wherein generating the second authentication code based on the second token and the first packet comprises:

in response to determining that the second token is valid, generating, by one or more processors, the second authentication code based on the second token and the first packet.

10. The computer-implemented method of claim 9, wherein generating the second authentication code based on the second token and the first packet comprises:

determining, by one or more processors, an identification for the first packet; and generating, by one or more processors, the second authentication code based on the second token and the identification.

11. The computer-implemented method of claim 10, wherein determining the identification for the first packet comprises:

obtaining, by one or more processors, a parity of the first packet; and determining, by one or more processors, the identification for the first packet based on the parity and a predefined length for the identification.

12. The computer-implemented method of claim 8, further comprising:

in response to determining that the second packet does not match the second token, obtaining, by one or more processors, a previous token which is issued before the second token, for authenticating a packet transmitted in the network system; and generating, by one or more processors, the second authentication code based on the previous token and the first packet.

13. The computer-implemented method of claim 12, further comprising: in response to determining the second packet does not match the previous token, dropping, by one or more processors, the second packet.

14. The computer-implemented method of claim 8, wherein the network system includes a Ethernet network and a Virtual eXtensible Local Area Network (VXLAN), the first network format includes an Ethernet format, the second network format includes a VXLAN format, the first and second agent devices include VXLAN Tunnel Endpoints, respectively, and the method is implemented by a plugin deployed at the second agent device.

15. The computed-implemented method of claim 8, further comprising:

in response to determining that the second packet matches the second token, forwarding, by one or more processors, the first packet that is included in a data field of the second packet, the first packet being generated according to a first network format, and the second packet being generated according to a second network format, and both of the first and second agent devices supporting the first and second network formats.

16. A computer-implemented system for VXLAN, comprising:

one or more computer processors;

one or more computer readable storage media; and program instructions stored on the one or more computer readable storage media for execution by at least one of the one or more computer processors, the program instructions including instructions to:

obtain, at a first agent device that is included in a network system, a token for authenticating a first packet that is transmitted in the network system, the first packet being generated according to a first network format;

generate, a second packet based, at least in part, on the first packet, the token according to a second network format, and an identification for the first packet;

transmit the second packet to a second agent device that is included in the network system, both of the first and second agent devices supporting the first and second network formats.

17. The computer-implemented system of claim 16, wherein the identification for the first packet comprises:

obtaining, by one or more processors, a parity of the first packet; and determining, by one or more processors, the identification for the first packet based, at least in part, on the parity and a predefined length for the identification.

18. The computer-implemented system of claim 17, wherein obtaining the parity of the first packet comprises: extracting, by one or more processors, a frame check sequence from the first packet according to the first network format.

* * * * *